United States Patent
Hyun

(10) Patent No.: US 10,499,625 B2
(45) Date of Patent: Dec. 10, 2019

(54) FISHING REEL HAVING NATURAL DRAINAGE STRUCTURE

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 16/223,882

(22) Filed: Dec. 18, 2018

(65) Prior Publication Data

US 2019/0183105 A1 Jun. 20, 2019

(30) Foreign Application Priority Data

Dec. 20, 2017 (KR) .................. 10-2017-0176002

(51) Int. Cl.
*A01K 89/01* (2006.01)
*A01K 89/015* (2006.01)

(52) U.S. Cl.
CPC .............................. *A01K 89/01928* (2015.05)

(58) Field of Classification Search
CPC .................. A01K 89/0192; A01K 89/01928
See application file for complete search history.

(56) References Cited

U.S. PATENT DOCUMENTS

| 2,578,477 | A | * | 12/1951 | Hurd | A01K 89/0192 43/20 |
| 4,681,276 | A | * | 7/1987 | Sato | A01K 89/0193 242/249 |
| 4,805,849 | A | * | 2/1989 | Nanbu | A01K 89/01928 242/319 |
| 6,016,982 | A | * | 1/2000 | Asano | A01K 89/01916 242/310 |
| 2010/0006688 | A1 | * | 1/2010 | Ikuta | A01K 89/01931 242/297 |
| 2010/0006690 | A1 | * | 1/2010 | Takechi | A01K 89/0192 242/396.5 |
| 2011/0232339 | A1 | * | 9/2011 | Norman | A01K 97/08 70/58 |
| 2016/0143259 | A1 | * | 5/2016 | Hyun | A01K 89/01912 242/273 |

(Continued)

FOREIGN PATENT DOCUMENTS

| JP | 2530266 | 12/1996 |
| JP | 2001078633 | 3/2001 |

(Continued)

*Primary Examiner* — Emmanuel M Marcelo
(74) *Attorney, Agent, or Firm* — Cantor Colburn LLP

(57) ABSTRACT

Provided is a fishing reel having a natural drainage structure. The fishing reel includes a first mounting part and a second mounting part provided at opposite sides thereof, a frame having a spool mounted between the first and second mounting parts, a first side cover at a palm side, the first side cover being combined with the first mounting part, and a second side cover at a gear side, the second side cover being combined with the second mounting part, the fishing reel including: a drainage hole provided on a lower end part of at least one of edge side wall parts of the first and second mounting parts and the first and second side covers, thereby naturally draining moisture introduced into the fishing reel to outside of the fishing reel.

5 Claims, 8 Drawing Sheets

(56) References Cited

U.S. PATENT DOCUMENTS

2017/0013817 A1\* 1/2017 Hyun .................. A01K 89/0102
2018/0042207 A1\* 2/2018 Niitsuma ......... A01K 89/01917
2018/0055027 A1\* 3/2018 Kobayashi ............. A01K 89/01
2018/0125049 A1\* 5/2018 Toake .............. A01K 89/01928

FOREIGN PATENT DOCUMENTS

| KR | 100503176 | 7/2005 |
| KR | 20120033241 | 4/2012 |
| KR | 101608513 | 3/2016 |
| KR | 20170009414 | 1/2017 |

\* cited by examiner

FISHING REEL HAVING NATURAL DRAINAGE STRUCTURE

BACKGROUND OF THE INVENTION

Field of the Invention

The present invention relates generally to a fishing reel having a natural drainage structure. More particularly, the present invention relates to a fishing reel having a natural drainage structure, the fishing reel including a first mounting part and a second mounting part provided at opposite sides thereof, a frame having a spool mounted between the first and second mounting parts, a first side cover at a palm side, the first side cover being combined with the first mounting part, and a second side cover at a gear side, the second side cover being combined with the second mounting part, the fishing reel including: a drainage hole provided on a lower end part of at least one of edge side wall parts of the first and second mounting parts and the first and second side covers, thereby naturally draining moisture introduced into the fishing reel to outside of the fishing reel, and particularly, draining moisture introduced to a gap between the spool and the frame, such that a water film phenomenon is prevented from occurring in the gap between the spool and the frame so as to prevent a casting distance decrease caused by a water film from occurring.

Description of the Related Art

As identified in Korean Patent Application Publication No. 10-2012-0033241, Korean Patent No. 10-0503176, and Korean Patent No. 10-1608513, as for a fishing reel, particularly, a bait casting reel, though a breaking means or a tension nut according to a control method of a spool is different in an operation structure thereof, a fundamental configuration thereof is the same.

Specifically, the fishing reel includes a frame to which the spool is mounted, a first side cover at a palm side, the first side cover being combined with a first mounting part 11 at a first side surface of the frame, and a second side cover at a gear side, the second side cover being combined with a second mounting part at a second side surface of the frame, wherein a handle is connected to the second side cover.

The fishing reel is provided to have a structure in which the first and second side covers are attached to and detached from the first and second mounting parts of the frame, respectively for maintaining the fishing reel.

In this case, the first side cover is combined with the first mounting part so as to cover a spool cover and the breaking means provided in the first mounting part, and the second side cover is combined with the second mounting part so as to cover a gear operating in conjunction with the handle and a tension nut operation part, which are provided in the second mounting part.

An inner space is provided between each of the mounting parts and each of the side covers so as to receive parts.

Since the seashore, a lake, and a river in which fishing is performed have much moisture and water easily reaches the fishing reel during fishing, the frame may become humid therein or have moisture frequently introduced thereinto, which easily causes malfunction of the fishing reel and corrosion of parts thereof.

In addition, as a manufacturing technique of a fishing line and a material thereof develop, a thickness of the fishing line has become very thin and a strength thereof has also become strong. Accordingly, as the size of the spool has become small, the entire size of the fishing reel has also become small.

As a thickness of a fishing line becomes thin, the fishing line may be caught in a gap between an outer side surface of the spool and an inner side surface of the frame. Accordingly, the gap between the spool and the frame is minimized to the degree of not interfering with rotation of the spool.

When the gap between the spool and the frame is very narrow, a fishing line may be prevented from being caught therebetween. However, a water film is formed between the spool and the frame and prevents the rotation of the spool, which decreases the casting distance of the fishing line.

That is, while a fishing line is cast, moisture on the fishing line during fishing moves in opposite side directions of the spool by gravity and is introduced to a gap between the spool and the frame. Accordingly, as the gap becomes very narrow, the water film is formed between the spool and the frame, which decreases the casting distance due to a frictional force caused by the water film during the rotation of the spool.

To solve problems caused by moisture mentioned above, the moisture causing a water film is required to be frequently removed after disassembling the first and second side covers and the spool. Accordingly, since removing moisture whenever a water film occurs during fishing is very inconvenient and prevents continuous fishing, it is impractical.

Accordingly, since it is almost impossible to prevent the introduction of moisture, alternatively, a structure of the fishing reel enabling the rapid discharge of introduced moisture or the removal of moisture via ventilation can maximally prevent a water film from being formed by the introduction of moisture.

As for most of the fishing reels released recently, the frame, combination portions of the first and second side covers, and an inner side surface with which the spool is in contact in the frame all have closed structures. Accordingly, as long as a user does not disassemble the fishing reel to dry for moisture removal, the natural discharge or removal of moisture during fishing is impossible.

SUMMARY OF THE INVENTION

Accordingly, the present invention has been made keeping in mind the above problems occurring in the related art, and the present invention is intended to propose a fishing reel having a natural drainage structure, wherein without a user drying and removing humidity filling an inner part of the fishing reel or moisture introduced thereinto during fishing, first and second mounting parts of a frame, first and second side covers, or all thereof include first and second drainage holes on lower end parts of edge side wall parts thereof such that the natural discharge or removal of the moisture is performed so as to prevent malfunction of the fishing reel or corrosion of parts thereof from occurring.

In addition, the present invention is intended to propose a fishing reel having a natural drainage structure, wherein a step part is provided by protruding to an outer side of each of opposite sides from an inner upper end part of each of the drainage holes of the edge side wall parts having the first and second drainage holes so as to facilitate a discharge of moisture through the first and second drainage holes.

Particularly, the present invention is intended to propose a fishing reel having a natural drainage structure, the fishing reel including: a third drainage hole provided on a lower end of a first wall part of the first mounting part covering a first side surface of a spool so as to enable the natural drainage and removal of moisture forming a water film by being introduced to a gap between the spool and the frame by flowing down a fishing line; an introduction hole inducing a discharge of moisture after the moisture is introduced to an inner side wall part, in contact with the spool, of the second mounting part; and a fourth drainage hole.

Furthermore, the present invention is intended to propose a fishing reel having a natural drainage structure, wherein a drainage guide groove is concavely formed on an inner surface of the edge side wall part such that the first mounting part of the frame is connected to a first drainage hole, whereby when a fishing rod is used, moisture introduced into a first side cover is naturally induced and drained by gravity.

In order to achieve the above object, according to one aspect of the present invention, there is provided a fishing reel including a first mounting part and a second mounting part provided at opposite sides thereof, a frame having a spool mounted between the first and second mounting parts, a first side cover at a palm side, the first side cover being combined with the first mounting part, and a second side cover at a gear side, the second side cover being combined with the second mounting part, the fishing reel including: a first drainage hole vertically formed through a lower end part of at least one of edge side wall parts of the first mounting part or the first side cover.

In addition, in the fishing reel according to the present invention, a second drainage hole may be provided by being vertically formed through a lower end part of at least one of edge side wall parts of the second mounting part or the second side cover.

Furthermore, in the fishing reel according to the present invention, the first drainage hole and the second drainage hole may be provided on the edge side wall part of the first mounting part and the edge side wall part of the second mounting part, respectively, wherein the edge side wall part having each of the drainage holes may include a step part connected thereto by protruding to an outer side of each of opposite sides from an inner upper end part of the drainage hole.

In addition, in the fishing reel according to the present invention, the first mounting part may include a third drainage hole provided by being vertically formed through a lower end part of a first wall part connected to the first mounting part by protruding therefrom to an inside of the fishing reel.

Furthermore, in the fishing reel according to the present invention, the second mounting part may include an introduction hole horizontally formed through a lower end part of a portion with which the spool is in contact in an inner side wall part, and a fourth drainage hole vertically communicating with the introduction hole while being horizontally formed through an upper end part of a portion with which the spool is not in contact in the inner side wall part.

Additionally, in the fishing reel according to the present invention, the first mounting part may include a drainage guide groove concavely provided on an inner surface of the edge side wall part along a circumferential direction thereof so as to be connected to the first drainage hole.

In the fishing reel having a natural drainage structure according to the present invention, moisture introduced into a gap between the spool and the frame as well as humidity filling an inner part of the fishing reel and moisture introduced thereinto is naturally discharged or removed by ventilation, whereby without a user frequently performing additional maintenance during fishing, the malfunction and corrosion of inner parts occurring due to moisture can be prevented by a natural drainage structure of the fishing reel, and a casting distance reduction caused by a water film can be prevented from occurring.

In addition, irrespective of a fishing rod laid horizontally or standing vertically or diagonally during fishing, moisture is moved down by gravity and naturally discharged, whereby drainage function can be secured continuously.

Accordingly, though the entire size of the fishing reel has become small in keeping with the recent trend of a light, thin, short, and small fishing reel, the weakness of the fishing reel accompanied by the trend, that is, the vulnerability to moisture must be addressed so as to protect the fishing reel, whereby the fishing reel can be conveniently used and durability thereof is improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
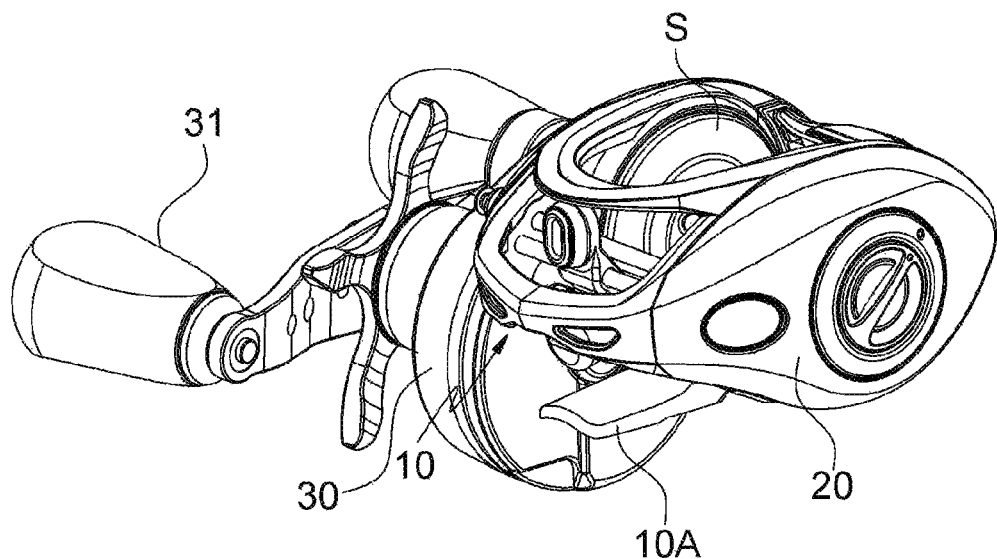
FIG. 1 is a perspective view of a fishing reel according to the present invention.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, tens and units, or reference numerals having like tens, units and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise.

It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first~' and 'a second~' are used only for the purpose for distinguishing a constitutive element from other constitutive element, but a constitutive element should not be limited to a manufacturing order, and the terms described in the detailed description of the invention may not be consistent with those described in the claims.

Figure 2A:
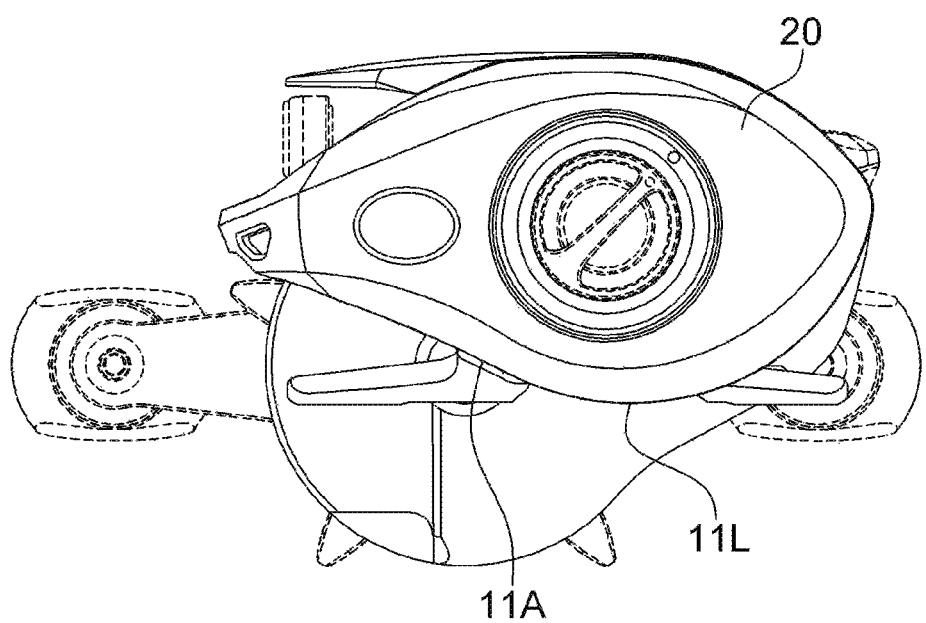
FIG. 2A is a left side sectional view of the fishing reel according to the present invention.
Figure 2B:
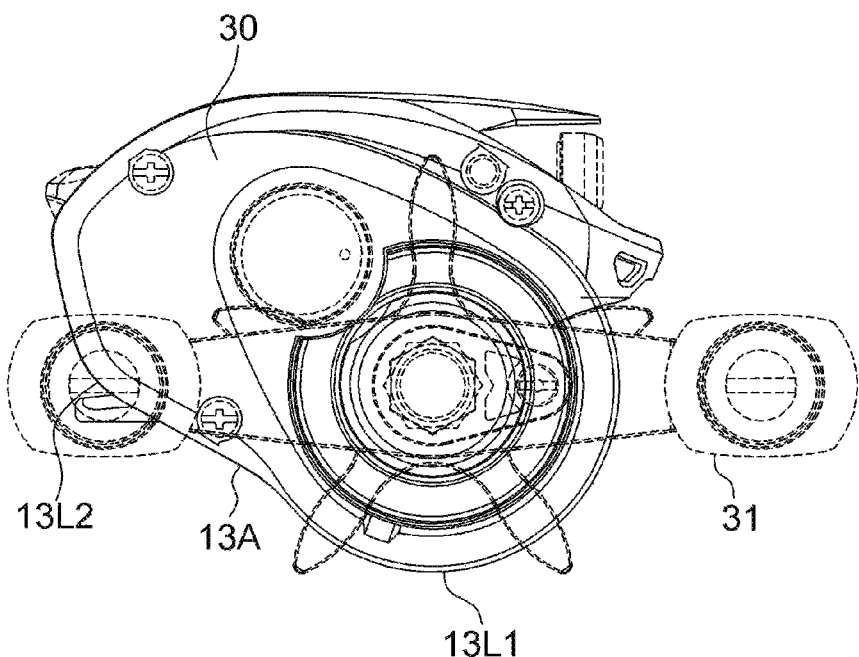
FIG. 2B is a right side sectional view of the fishing reel according to the present invention.
Figure 2C:
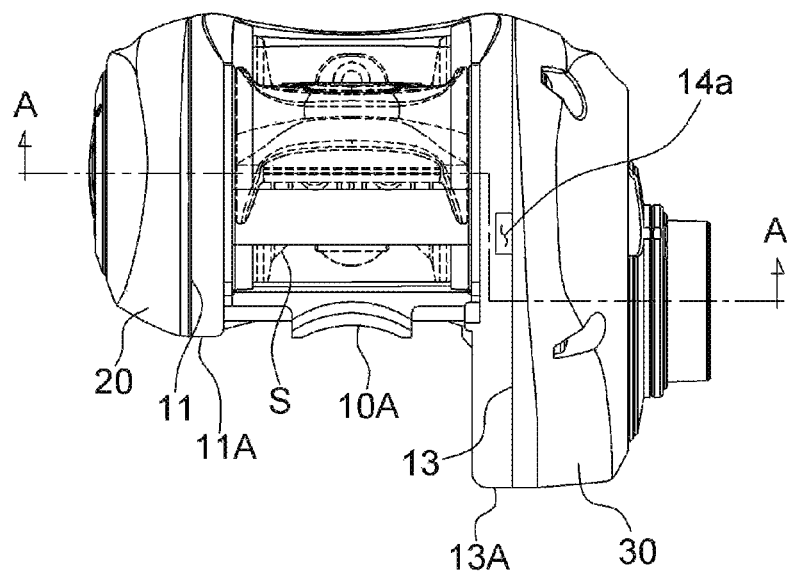
FIG. 2C is a rear view of the fishing reel according to the present invention.
Figure 2D:
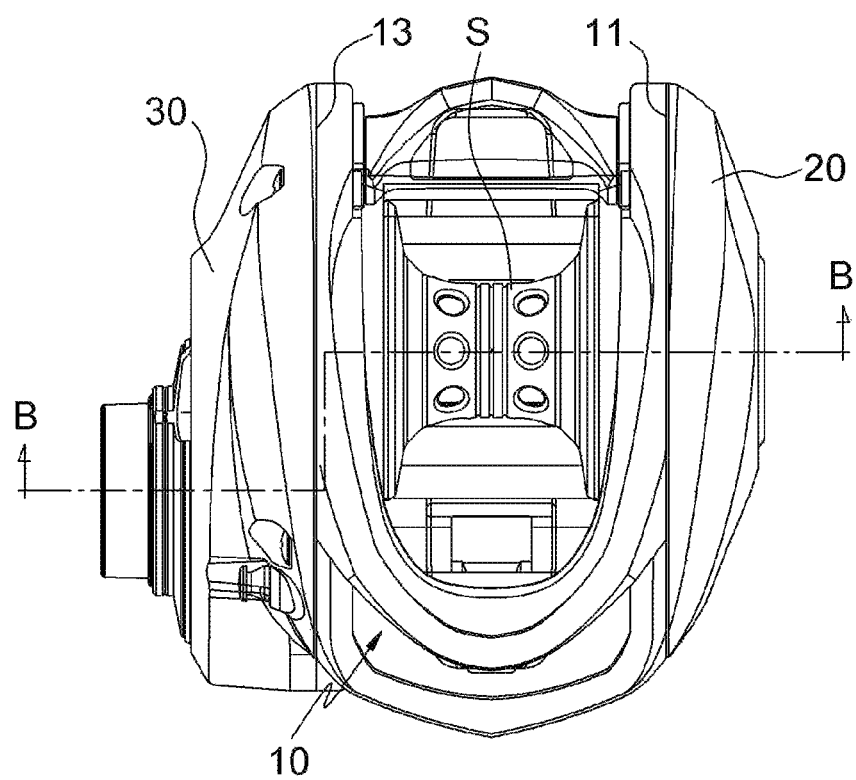
FIG. 2D is a top plan view of the fishing reel according to the present invention.

When an approximate directional standard is determined referring to FIG. 2C for convenience in describing a fishing reel having a natural drainage structure according to the present invention, a direction in which gravity acts is a lower side. Further, an upper side, a lower side, a left side, and a right side will be determined by the directions in the drawings, and unless otherwise defined, a detailed description of the invention and claims in relation to the other drawings will be described based on the standard.

Hereinbelow, the fishing reel having a natural drainage structure according to the present invention will be described referring to the accompanying drawings.

Figure 3A:
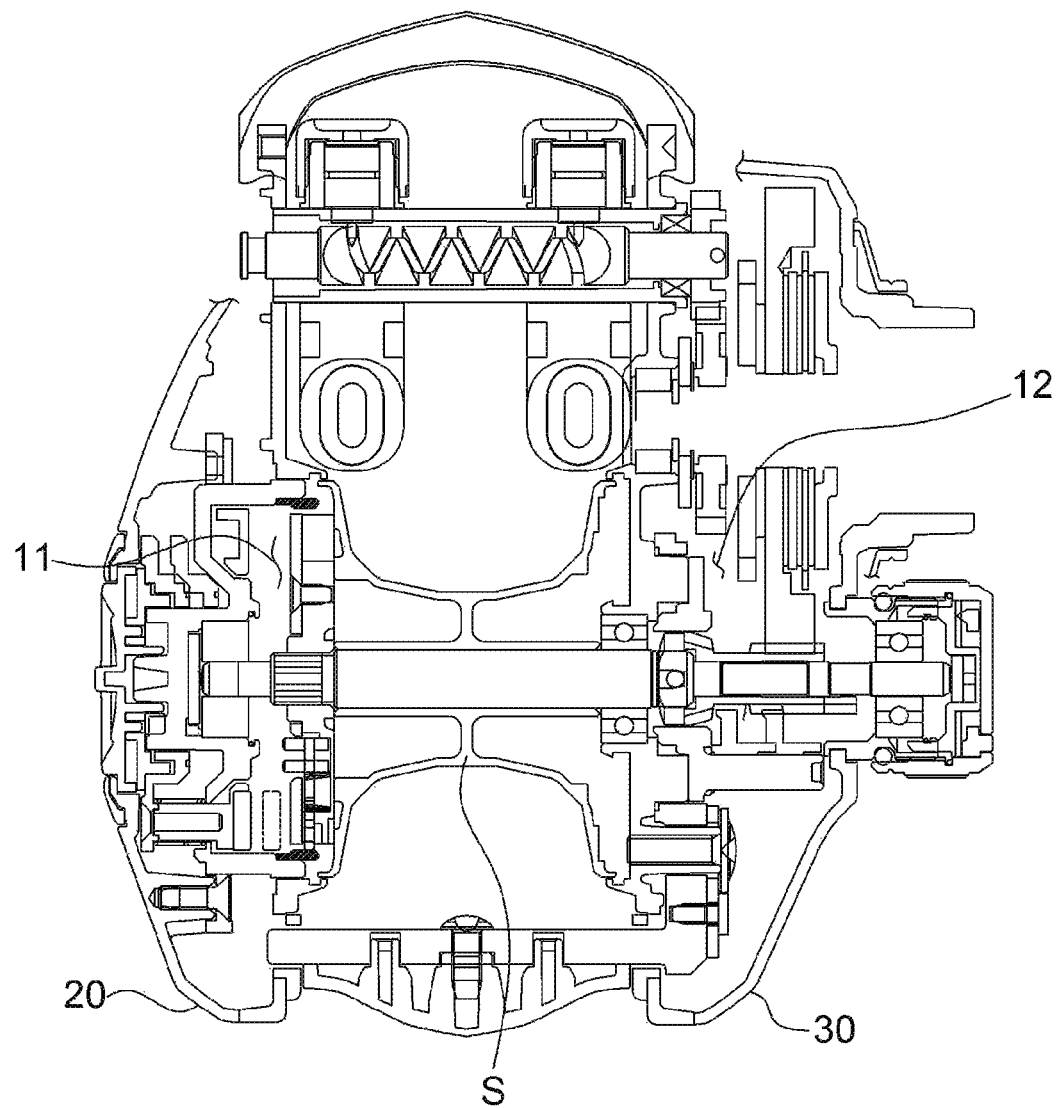
FIG. 3A is a cross-sectional view taken along line A-A of FIG. 2C.
Figure 3B:
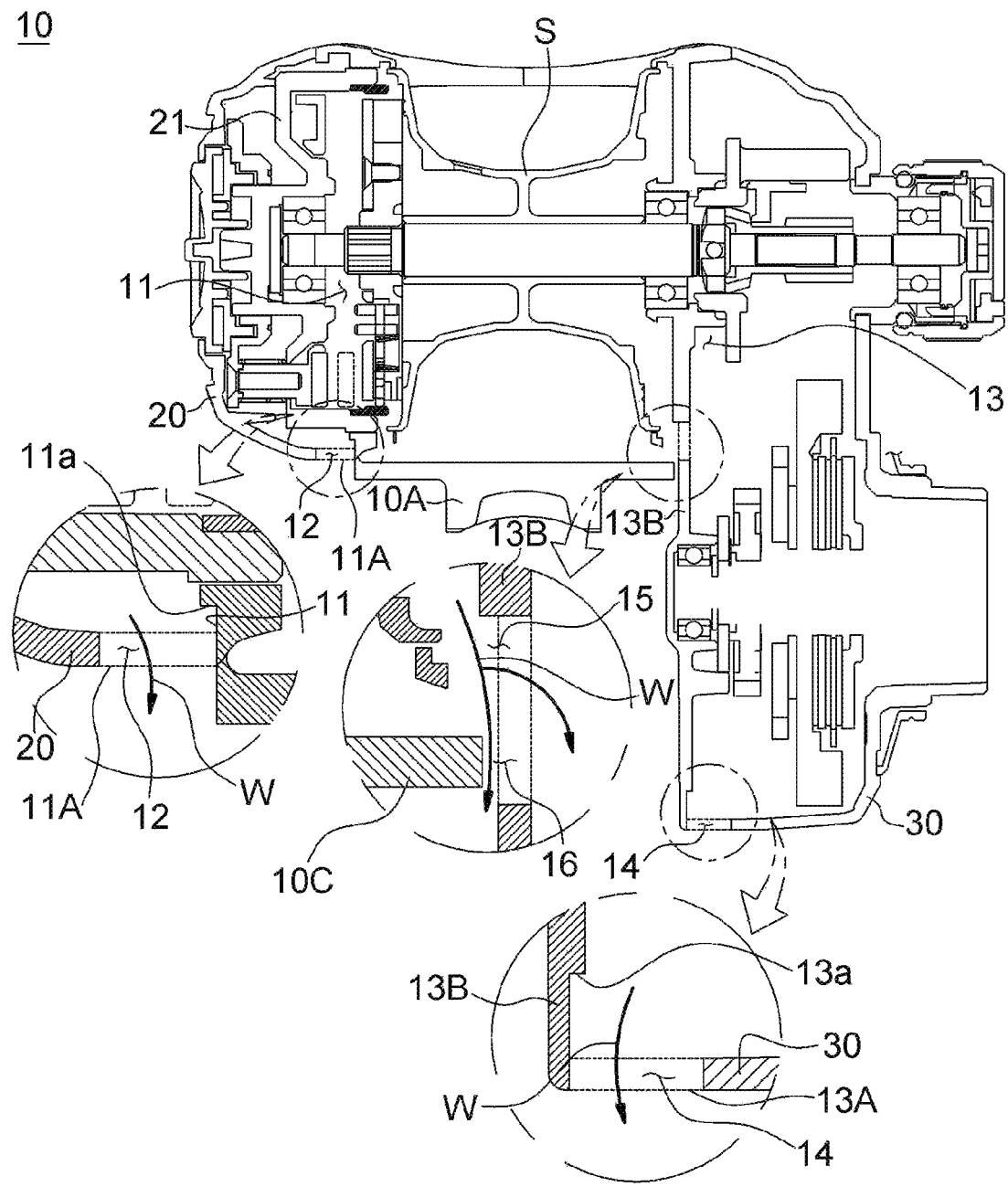
FIG. 3B is a cross-sectional view taken along line B-B of FIG. 2D.
Figure 4:
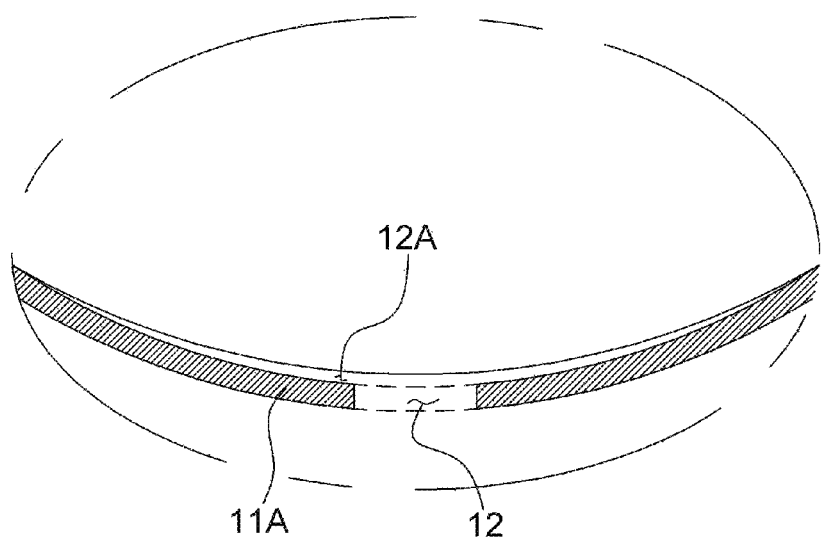
FIG. 4 is a partial cross-sectional view of a first mounting part roughly showing a drainage guide groove according to the present invention.
Figure 5A:
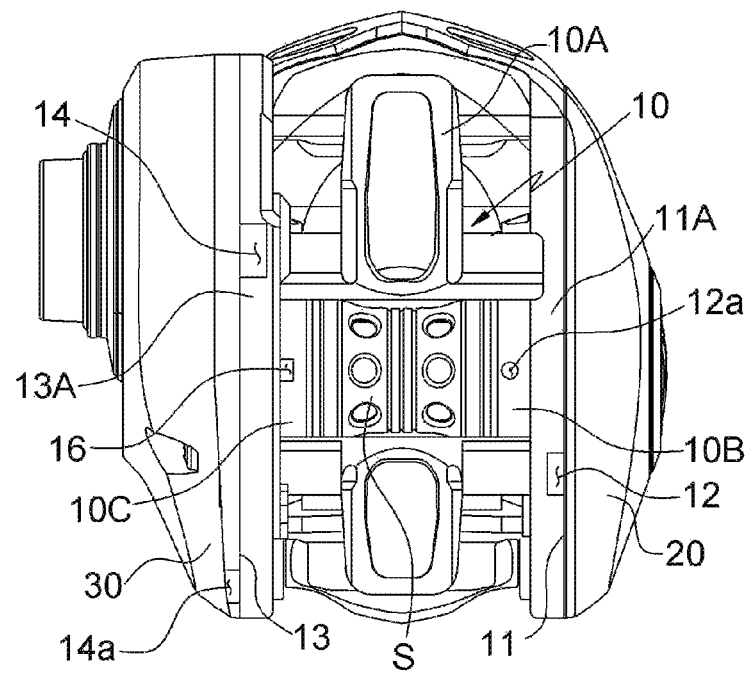
FIG. 5A is a top plan view showing another embodiment different from an embodiment of FIG. 2E.
Figure 5B:
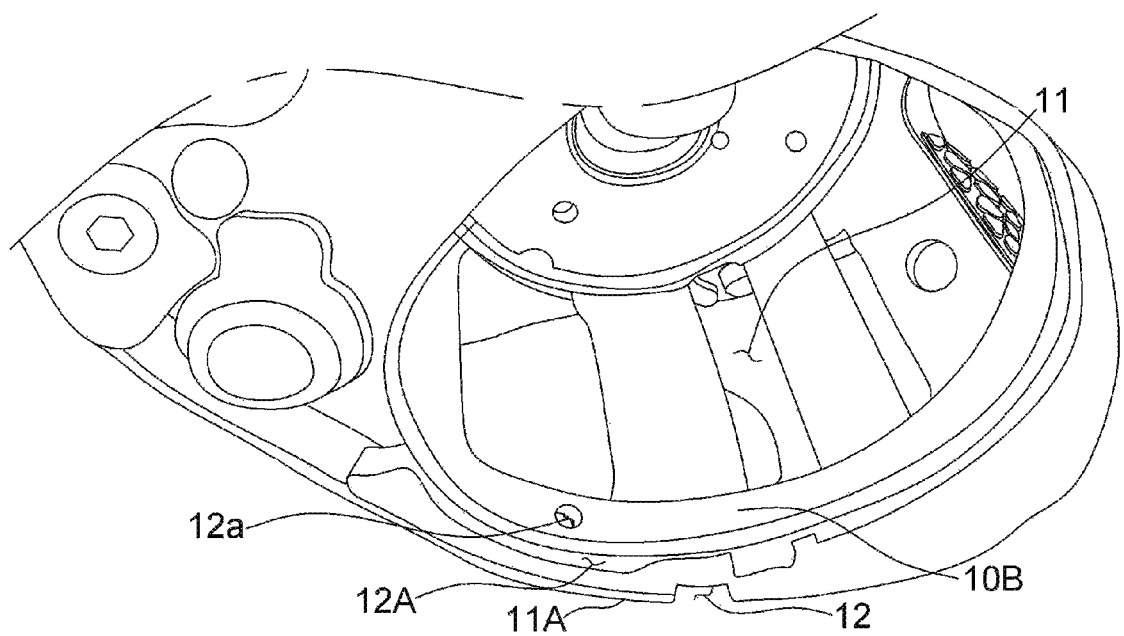
FIGS. 5B and 5C are perspective views of important parts of the fishing reel according to the present invention.
Figure 5C:
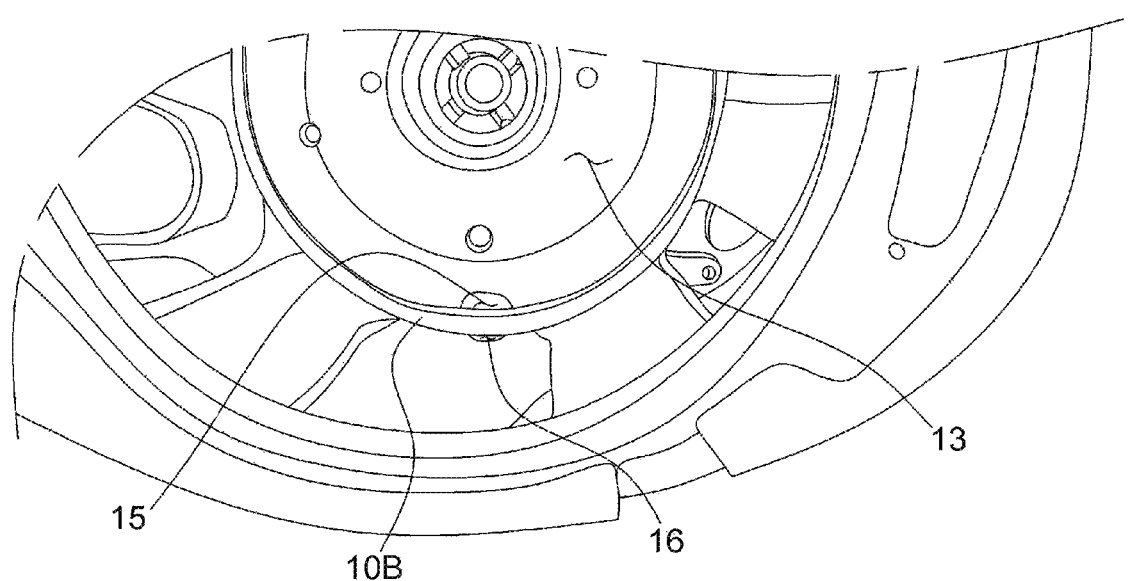

FIG. 1 is a perspective view of the present invention; FIGS. 2A to 2E are a left side sectional view, a right side sectional view, a rear view, a top plan view, a bottom view, respectively, of the present invention; FIGS. 3A and 3B are cross-sectional views taken along lines A-A and B-B, respectively, of the present invention; FIG. 4 is a cross-sectional view of an important part of the present invention; FIG. 5A is a top plan view showing another embodiment different from an embodiment of FIG. 2E according to the present invention; and FIGS. 5B and 5C are perspective views of important parts of the present invention. For the convenience of understanding, the configuration of a handle 31 is omitted in some of the drawings, and diagonal lines are drawn only on a partially-expanded cross-sectional views of FIG. 3B The present invention relates to the fishing reel including: a first mounting part 11 and a second mounting part 13 provided at opposite sides of the fishing reel, a frame 10 having a spool S mounted between the first and second mounting parts 11 and 13, a first side cover 20 at a palm side, the first side cover being combined with the first mounting part 11, and a second side cover 30 at a gear side, the second side cover being combined with the second mounting part 13.

A reference numeral 10A, which is not described, is a support used to mount the fishing reel to a fishing rod, reference numerals 10B, 10C are first and second wall parts connected to the first and second mounting parts 11 and 13, respectively, by each of the first and second wall parts protruding to an inner side of the fishing reel (a direction of the spool) along a circumferential direction of each of the first and second mounting parts 11 and 13 so as to cover an outer diameter of each of opposite side surfaces of the spool S, and reference numeral 21 is a spool cover to which a shaft of the spool S is mounted and combined with the second mounting part 13 so as to be used for attachment/detachment of the spool S while covering a left side surface of the spool S.

In this case, the first mounting part 11 of the frame 10 includes an edge side wall part connected thereto so as to cover an outer diameter of the left side surface of the spool S while being open in a middle of the edge side wall part for the attachment/detachment of the spool S.

The second mounting part 13 of the frame 10 includes an inner side wall part 13B of a closed plate shape so as to have a portion connected to the spool by protruding to a lower side of each of front/rear end parts of the spool while being in contact with a right side surface of the spool S such that an operation part of a fix and tension nut and the handle 31 operate in conjunction with the gear after the spool S is mounted, and the edge side wall part being connected to the inner side wall part 13B along an edge thereof and protruding to an outer side (a direction of the handle 31) thereof.

In addition, the fishing reel of the present invention may include all kinds of parts and functions applicable to a known fishing reel, particularly, to a bait casting reel to the degree that a key configuration of the present invention which will be described hereinafter is not obscured.

First, according to the present invention, a first drainage hole 12 is vertically formed through a lower end part of at least one of edge side wall parts of the first mounting part 11 and the first side cover 20.

In addition, a second drainage hole 14 is vertically formed through a lower end part of at least one of edge side wall parts of the second mounting part 13 and the second side cover 30.

Although the first and second drainage holes 12 and 14 are not limited in their positions or numbers, at least one first drainage hole 12 and at least one second drainage hole 14 are provided on respective lowest points on the lower end parts of the edge side wall parts of the first and second mounting parts 11 and 13 and/or the first and second side covers 20 and 30, whereby preferably, moisture or humidity (hereinbelow, referred to as moisture W) introduced into an inner space between the frame and the first and second side covers 20 and 30, which is an inner part of the fishing reel, naturally moves downward along each of the edge side wall parts due to gravity and is discharged to the first and second drainage holes 12 and 14.

In addition, more preferably, each of the first and second drainage holes 12 and 14 is provided on a lower end part of each of the edge side wall parts of the frame 10 (hereinafter, divided into a first lower edge part 11A and a second lower edge part 13A), not on the lower end part of each of the edge side wall parts of the first and second side covers 20 and 30.

It is since due to shapes of the first and second side covers 20 and 30 (each of the side covers convexly protruding toward an outer side thereof in opposite directions so as to have a curved surface shape), forming the first and second drainage holes 12 and 14 on the edge side wall parts of the side covers rather than on first and second lower edge parts 11A and 13A of the frame 10 is not preferable, and causes more damage due to an attaching/detaching structure of the first and second side covers 20 and 30.

The first and second lower edge parts 11A and 13A of the frame 10 are configured to be cut only in a portion of each of lowest points thereof so as to form the first and second drainage holes 12 and 14, respectively.

In this case, the lowest point of each of the first and second lower edge parts 11A and 13A includes a lowest portion thereof positioned when the frame 10 of the fishing reel is horizontally placed and a lowest portion thereof most frequently positioned depending on angles of the fishing reel being gripped during fishing.

That is, since the fishing rod may be used lying horizontally, or standing vertically or diagonally during fishing, the first and second drainage holes 12 and 14 are preferably provided at lowest points of the first and second lower edge parts 11A and 13A, respectively, the lowest points being changeable according to angles at which the frame 10 is used.

Accordingly, the lowest point in a horizontal state and the lowest point in a vertical or diagonal state in the second mounting part 13 during the use of the fishing reel are different due to a side surface shape of the second mounting part 13.

Figure 2E:
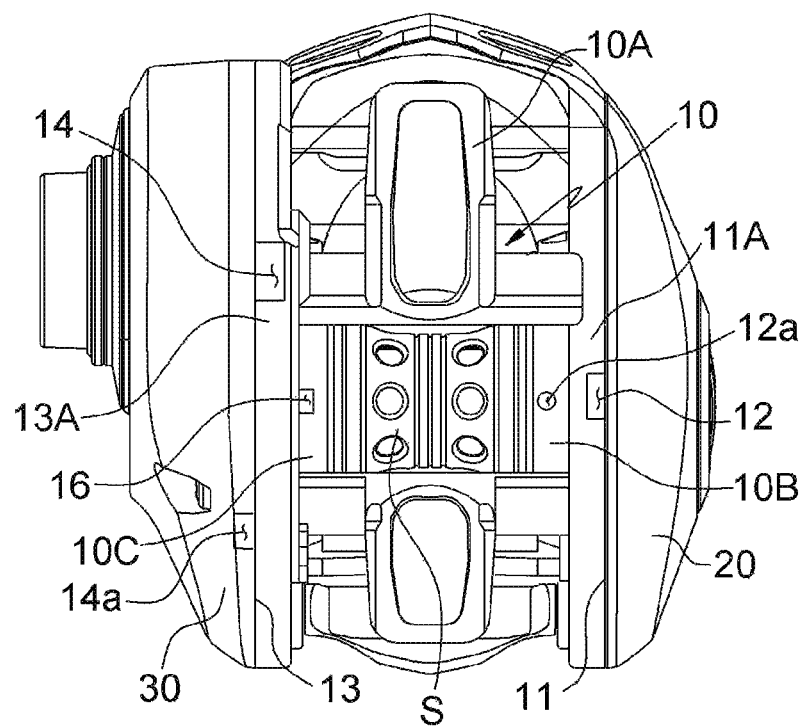
FIG. 2E is a bottom view of the fishing reel according to the present invention.

Accordingly, as shown FIG. 2E, it may be identified that a portion protruding to a lower side of the second lower edge part 13A at a front end part thereof and a portion protruding to a lower side of the second side cover 30 at a rear end part thereof include the second drainage holes 14 and 14a, respectively, provided at each of middle parts 13L1, 13L2 thereof (see FIG. 2B).

As shown FIG. 5A, it may be identified that the second drainage holes 14 and 14a are provided at middle portions of the portions protruding to the lower sides of the front and a rear end portion of the second lower edge part 13A, respectively.

In addition, unlike the second drainage holes 14 and 14a positioned at the front and rear end portion, one first drainage hole 12 is provided only at a lowest point 11L of the first lower edge part 11A (see FIG. 2A) in a horizontal state (as shown in FIG. 5A, the first drainage hole 12 is provided at a lowest point in a state slightly inclined rearward from the horizontal state).

As described above, since shapes of entire side surfaces of the first and second mounting parts 11 and 13 are different from each other (asymmetrical except for portions to which the spool S is mounted), moisture W is naturally discharged though the first drainage hole 12 of the first mounting part 11 is provided at the lowest point even while the first mounting part 11 alone is in the horizontal state and the second mounting part 13 is not in the horizontal state.

That is, when only the second drainage hole 14 of the front portion is provided on the second mounting part 13, the lowest point of the rear portion changes due to the shape of the side surface of the second mounting part 13 when the fishing reel stands, whereby moisture W is not naturally drained to the second drainage hole 14 of the front portion. Accordingly, the second drainage holes 14 and 14a are provided at both of the lowest points of the front/rear portion so as to constantly perform a natural drainage irrespective of the angle of the fishing reel in use.

Meanwhile, only the first drainage hole 12 positioned at the lowest point of the middle (or a rear side of the middle) of the first mounting part 11 enables the natural drainage though the angle of the fishing reel in use changes. Accordingly, though the first drainage hole is not provided additionally at the rear portion of the first mounting part, moisture W may be discharged.

Of course, one first drainage hole may be additionally provided at the lowest point of the first lower edge part 11A in the vertical or diagonal state, that is, at a position corresponding to the second drainage hole 14a of the rear portion.

The first and second drainage holes 12, and 14 and 14a are used to directly discharge moisture W and allows inner parts of the first and second side covers 20 and 30 to be ventilated, thereby rapidly drying and removing undischarged moisture.

Furthermore, the first and second lower edge parts 11A and 13A include first and second step parts 11a and 13a, respectively, connected thereto by each of the first and second step parts 11a and 13a protruding to an outer side (an inner side of the drainage hole) of each of opposite sides from an inner upper end part of each of the first and second drainage holes 12 and 14.

Each of the first and second step parts 11a and 13a has a height different from each of the first and second drainage holes 12 and 14 (that is, the upper end part of each of the drainage holes 12 and 14 is provided at a side inner than each of the step parts 11a and 13a so as to have a step structure and the height difference therebetween). Accordingly, the discharge of moisture W through the first and second drainage holes 12 and 14 is better facilitated by the height difference.

Furthermore, the first mounting part 11 includes a drainage guide groove 12A concavely provided on an inner surface of the edge side wall part (the first lower edge part 11A) along a circumferential direction thereof so as to be connected to the first drainage hole 12.

As for the drainage guide groove 12A, a height of a portion of the inner surface of the first lower edge part 11A is provided inclinedly downward toward the first drainage hole 12, whereby moisture W introduced into an inner part of the fishing reel (an inner part of the first side cover 20) flows through the drainage guide groove 12A along an area between the spool cover 21 and the first lower edge part 11A so as to be discharged to the first drainage hole 12.

As shown in FIG. 4, the drainage guide groove 12A may be extended in a forward/rearward direction of the first drainage hole 12, and as shown in FIG. 5B, a protrusion used for attachment/detachment of the first side cover 20 protrudes at a rear portion of the first drainage hole 12. Accordingly, it may be identified that the drainage guide groove detours the protrusion of the rear portion so as to be connected to the first drainage hole 12.

Meanwhile, the first mounting part 11 may include a third drainage hole 12a provided by being vertically formed through a lower end part of a first wall part 10B.

Like the other drainage holes, the third drainage hole 12a allows moisture W to directly be discharged and to be removed by ventilation.

Particularly, the third drainage hole 12a is provided at a position communicating with a gap formed between the left side surface of the spool S and a right side surface (an inner side surface) of the spool cover 21, and discharges moisture W forming a water film by being introduced to the gap to the third drainage hole 12a, thereby preventing the water film from being formed between the spool S and the frame 10.

As described above, since the first side cover 20 and the spool S are closed to each other by the spool cover 21, moisture W introduced into the spool cover 21 is not discharged to the first drainage hole 12. Accordingly, the third drainage hole 12a is added to discharge and remove the moisture W.

Preferably, the third drainage hole 12a is provided by being vertically formed through the lower end part of the first wall part 10B.

Furthermore, the second mounting part 13 includes an introduction hole 15 horizontally formed through a lower end part of a portion with which the spool S is in contact in the inner side wall part 13B.

The introduction hole 15 allows opposite side surfaces of the inner side wall part 13B to communicate with each other, and after moisture W forming a water film by being introduced to a gap between the spool S and the inner side wall part 13B is introduced through the introduction hole 15 into the second side cover 30, the moisture is moved downward by gravity and discharged to the second drainage hole 14, whereby a water film is prevented from being formed between the spool S and the frame 10.

The introduction hole 15 is preferably provided at the lowest point of a portion with which the right side surface of the spool S is in contact in the inner side wall part 13B, that is, over the lowest point of the second wall part 10C, relative to the horizontal state of the fishing reel.

In addition, the second mounting part 13 includes a fourth drainage hole 16 vertically communicating with the introduction hole 15 while being horizontally formed through an upper end part of a portion with which the spool S is not in contact in the inner side wall part 13B.

The fourth drainage hole 16, which is provided so as to be vertically symmetrical to the introduction hole 15 relative to the second wall part 10C, is preferably provided at a highest point of a portion with which the right side surface of the spool S is not in contact in the inner side wall part 13B, more exactly, under the lowest point of the second wall part 10C.

That is, the introduction hole 15 and the fourth drainage hole 16 vertically communicate with each other on the same line of a vertical direction while passing through the inner side wall part 13B, relative to the second wall part 10C.

Accordingly, after moisture W forming a water film by being introduced to a gap between the right side surface of the spool S and a left side surface of the inner side wall part 13B (an inner side surface thereof) is introduced into the introduction hole 15, some of the moisture W is discharged through the fourth drainage hole 16 to an outside of the fishing reel, and the remaining moisture W is discharged through the second drainage hole 14 to the outside of the fishing reel.

That is, apart from the second drainage hole 14, a structure in which the introduction hole 15 and the fourth drainage hole 16 communicate with each other allows moisture W introduced to the gap between the spool S and the frame 10 to directly discharge to an outside of the frame 10, thereby preventing a water film from forming.

As described above, a structure in which the introduction hole 15, the fourth drainage hole 16, and the second drainage hole 14 communicate with each other allows moisture W to directly discharge and humidity to be removed by ventilation.

Though the present invention has been described chiefly on the fishing reel having a natural drainage structure referring to the accompanying drawings, those skilled in the art will appreciate that various modifications, additions and substitutions are possible, without departing from the scope and spirit of the invention as disclosed in the accompanying claims.

What is claimed is:

1. A fishing reel including a first mounting part and a second mounting part provided at opposite sides thereof, a frame having a spool mounted between the first and second mounting parts, a first side cover at a palm side, the first side cover being combined with the first mounting part, and a second side cover at a gear side, the second side cover being combined with the second mounting part, the fishing reel comprising:
    a first drainage hole vertically formed through a lower end part of at least one of edge side wall parts of the first mounting part and the first side cover,
    a second drainage hole provided by being vertically formed through a lower end part of at least one of edge side wall parts of the second mounting part and the second side cover, and
    a third drainage hole provided by being vertically formed through a lower end part of a first wall part connected to the first mounting part by protruding therefrom to an inside of the fishing reel.

2. The fishing reel of claim 1, wherein the first drainage hole and the second drainage hole are provided on the edge side wall part of the first mounting part and the edge side wall part of the second mounting part, respectively, wherein
    the edge side wall part having each of the drainage holes includes a step part connected thereto by protruding to an outer side of each of opposite sides from an inner upper end part of the drainage hole.

3. The fishing reel of claim 1, wherein the second mounting part includes an introduction hole horizontally formed through a lower end part of a portion with which the spool is in contact in an inner side wall part, and a fourth drainage hole vertically communicating with the introduction hole while being horizontally formed through an upper end part of a portion with which the spool is not in contact in the inner side wall part.

4. The fishing reel of claim 1, wherein the first mounting part includes a drainage guide groove concavely provided on an inner surface of the edge side wall part along a circumferential direction thereof so as to be connected to the first drainage hole.

5. A fishing reel including a first mounting part and a second mounting part provided at opposite sides thereof, a frame having a spool mounted between the first and second mounting parts, a first side cover at a palm side, the first side cover being combined with the first mounting part, and a second side cover at a gear side, the second side cover being combined with the second mounting part, the fishing reel comprising:
    a first drainage hole vertically formed through a lower end part of at least one of edge side wall parts of the first mounting part and the first side cover,
    wherein the second mounting part includes an introduction hole horizontally formed through a lower end part of a portion with which the spool is in contact in an inner side wall part, and a fourth drainage hole vertically communicating with the introduction hole while being horizontally formed through an upper end part of a portion with which the spool is not in contact in the inner side wall part.

* * * * *